Patented Apr. 19, 1927.

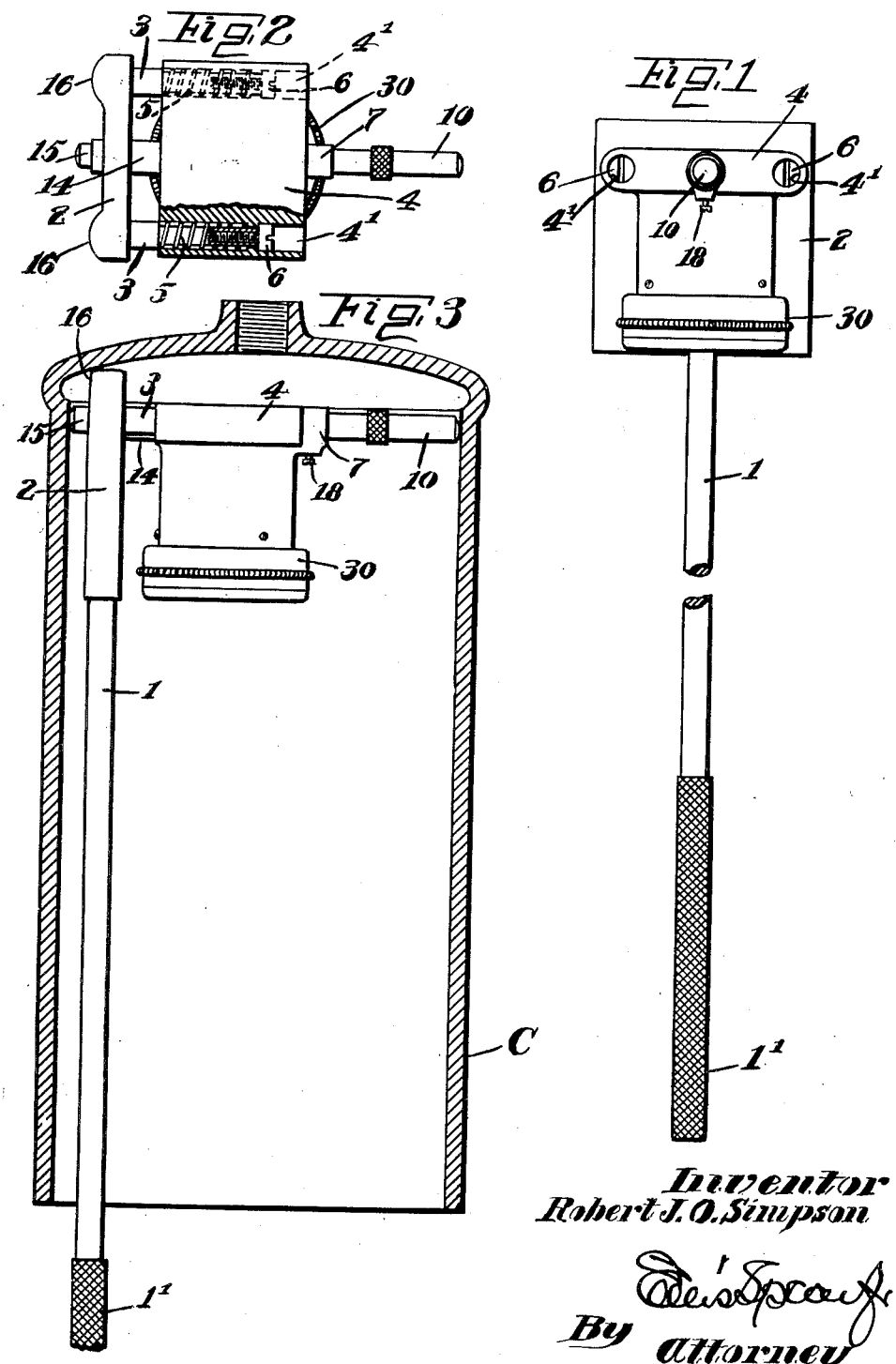

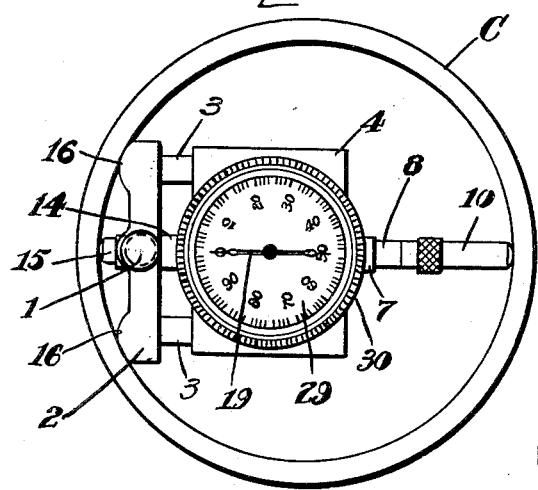
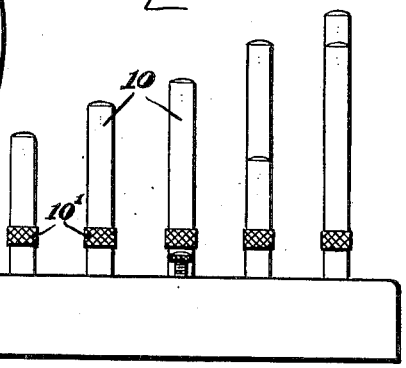
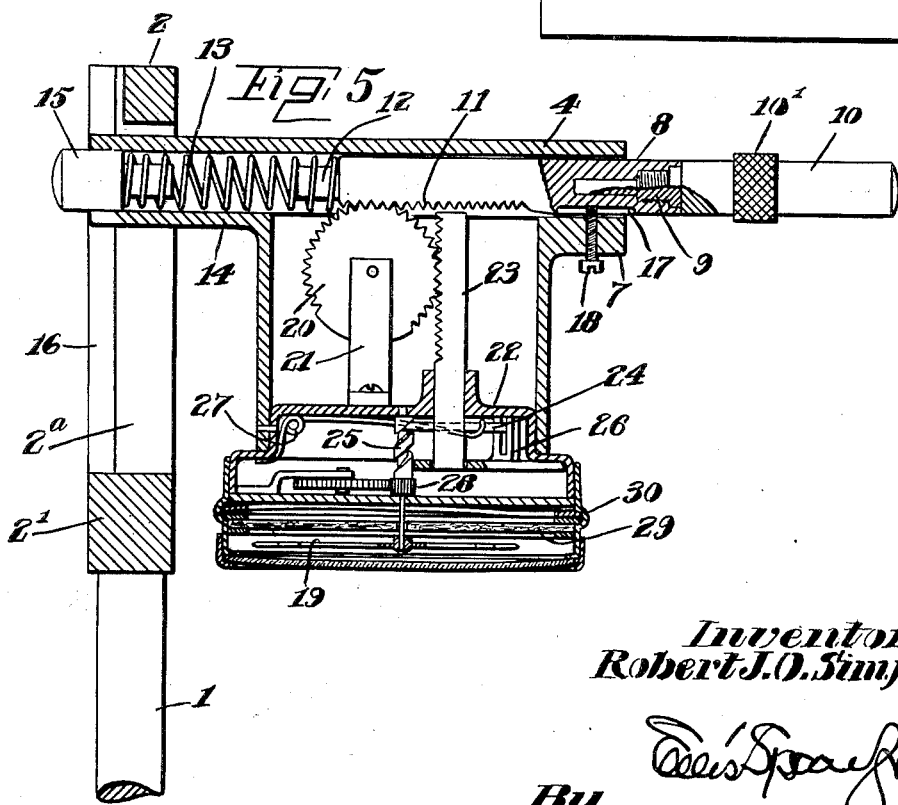

1,625,766

UNITED STATES PATENT OFFICE.

ROBERT J. O. SIMPSON, OF ATHOL, MASSACHUSETTS, ASSIGNOR TO THE L. S. STARRETT COMPANY, OF ATHOL, MASSACHUSETTS, A CORPORATION OF MASSACHUSETTS.

DIAL INDICATOR.

Application filed August 21, 1922. Serial No. 583,159.

This invention relates to indicators, and particularly to an indicator for gauging the cylinders of an internal combustion engine to determine the variation, if any, in the cylinder bore. My dial indicator is especially useful in checking cylinder sizes, in inspecting finished cylinders, and in visually indicating to a car owner that the cylinders of his engine require regrinding.

One object of my invention is to provide a simple and dependable gauge of the class indicated for instantly and accurately indicating variations in any portion of the cylinder bore, and particularly for indicating variations at the end of the cylinder, at which point the wear is greatest and most difficult to gauge with the ordinary cylinder gauge. With my device, it is possible to calibrate the cylinder throughout the entire length of the cylinder bore.

Another object of my invention is to provide a cylinder gauge which will have a positive and steady bearing on the cylinder wall and in which the dial indicator itself will be capable of a slight preliminary adjustment, if such adjustment should be necessary, relative to its mount when the device is inserted into the cylinder bore whereby the device may be accommodated within a limited range to cylinders of varying sizes without changing the pointer-actuating contact stem.

A further object of my invention is to provide a cylinder gauge which may be adapted to a widely varying range of cylinder sizes through the use of a plurality of detachable and interchangeable contact stems of different lengths.

These objects, and certain other features of advantage which will appear more fully hereinafter, are secured in the device of the present invention.

The construction and operation of my device, together with a form thereof which well illustrates the principles involved, is described and shown in the accompanying specification and drawings and the characteristic features of novelty are particularly pointed out in the appended claims. Throughout the specification and drawings like reference characters are correspondingly employed, and in the drawings:

Fig. 1 is an elevation of a dial indicator in accordance with my invention.

Fig. 2 is a bottom plan view thereof, partly broken away to illustrate the interior construction.

Fig. 3 is a view at right angles to Fig. 1 and illustrating the manner of gauging the cylinder bore.

Fig. 4 is a plan view of Fig. 3, looking into the open end of the cylinder.

Fig. 5 is an enlarged detail section, and

Fig. 6 is a view of an assembly of detachable and interchangeable contact stems adapted to be used with my indicator to accommodate the device to a widely varying range of cylinder sizes.

I have indicated at 1 the handle of a dial indicator in accordance with my invention. The outer end of the handle is preferably milled as indicated at 1' to provide a convenient finger hold. The inner end of the handle 1 is threaded in a bearing formed centrally in the cross piece 2' at one end of an open rectangular frame 2. Projecting horizontally from the uprights 2$^a$ of the frame 2 is a pair of spaced guide posts 3 on which is guided the base 4 of a dial indicator.

The base 4 is socketed as indicated at 4' to receive the posts 3 and is slidable towards the frame or sled 2 against the action of a pair of springs 5 (Fig. 2) which are coiled about the posts 3 and are adapted to abut a pair of screws 6 threaded into the outer ends of the posts 3 when the slide 4 is forced inwardly towards the frame 2.

Between the sockets 4' the base 4 is provided at one edge with a bearing 7 (Fig. 5) within which is slidably mounted a rack bar 8 which is socketed and threaded at its outer end, as indicated at 9, to receive the correspondingly threaded end of a contact stem 10. Between its ends the rack bar 8 is provided with a longitudinal series of rack teeth 11 and beyond said teeth is reduced as indicated at 12, Fig. 5, to receive a coil spring 13 which is confined within a bearing 14 formed on the opposite edge of the base 4 in alignment with the bearing 7. At its opposite ends the spring 13 abuts a contact element 15 fixed within said bearing 14 and projecting slightly beyond the rounded edges 16 of the vertical side members 2$^a$ of the frame 2, which edges have a radius substantially equal to the curvature of the smallest cylinder bore to which the indicator is adaptable to the curvature of the cylinder wall.

The detachable connection at 9 permits contact stems 10 of different lengths (see Fig. 6) to be used with the device thereby adapting the device to cylinders of different diameters. Each stem 10 is preferably milled between its ends, as indicated at 10', to permit it to be readily grasped and threaded into the socket 9 of the rack bar 8.

The rack bar is provided between its ends with a longitudinal slot 17 (Fig. 5) within which is disposed a set screw 18 mounted in the bearing 7 and adapted to limit the horizontal travel of said rack bar. The reciprocation of the rack bar is transmitted to the pointer 19 of the dial indicator as rotary motion by means of a gear segment 20 meshing with the rack teeth 11 and journaled in a split bearing 21 fast to the under side of the indicator casing 22. The gear segment 20 in turn meshes with the teeth of a vertically disposed rack bar 23 journaled in said casing 22 and provided with a transverse pin 24, one end of which is disposed in a spiral groove cut in the pointer barrel 25 and the opposite end of which is guided in a guide 26 fulcrumed on the casing 22. The upward movement of the rack bar 23 is resisted by a coil spring 27 anchored within said casing and engaging the pin 24 at one end.

The rotation of the barrel 25 is transmitted to the pointer 19 through a gear train 28 whereby to rotate said pointer over the graduated dial 29 of the indicator.

In use, a contact stem 10 of the approximate proper length for the diameter of the cylinder to be tested is threaded into the outer end of the rack bar 8 and the device inserted into the bore of the cylinder C. With my device it is possible to insert the dial indicator substantially completely to the bottom of the cylinder and the rounded edges 16 of the uprights 2ª permit the frame to snugly bear against the curved inner face of the cylinder wall.

The tension of the spring 13 is greater than the combined tension of the springs 5—that is to say, the spring 13 is superior to the springs 5. This permits the base 4, and with it the dial indicator to be moved inwardly towards the frame 2, where the stem 10 is of slightly greater length than is necessary for the internal diameter of the cylinder, without affecting the gauging operation, since any movement of the pointer 19 over the dial during the preliminary adjustment of the device to the cylinder may be taken care of by resetting the pointer at zero before the actual calibrating of the cylinder is commenced. In such reset, the dial 29 is turned relative to the pointer by means of the milled edge transparent cover 30 of the dial which is rotatably mounted upon the casing 22.

The cylinder may now be calibrated throughout its entire length and circumference by moving the gauge back and forth within the cylinder. In such movement the rounded contact ends of the stems 10 and 15 bear against the inner face of the cylinder wall at diametrically opposite points to follow any irregularities which may exist and through the rack bar 8, gear segment 20, rack bar 23, grooved barrel 25 and gear train 28, the movement of the stem 10 is transmitted to the pointer 19 whereby to register such variations upon the dial 29, which is preferably graduated in thousandths of an inch. The gage moreover will of itself stay lodged within the bore at the selected elevation, thus leaving the hands of the user free for other work and will continuously indicate the reading while so lodged in the bore, so that the user may refer at will thereto from time to time as occasion requires.

When a variation is indicated on the dial, the reading is noted after which the gauge is removed from the cylinder and the rounded ends of the contact points 10 and 15 placed between the jaws of an outside micrometer. The micrometer spindle is then rotated until the pointer 19 of the gauge again registers the same reading on the dial as it did when the gauge was inserted in the cylinder.

The dial indicator may be bodily detached from the frame 2, if desired, and used as an inside micrometer. In such use, the dial indicator is held grasped between the fingers to bring the contact elements 10 and 15 against the surfaces to be calibrated.

Various modifications in the construction and manner of use of my device may obviously be resorted to if within the limits of the appended claims.

What I therefore claim and desire to secure by Letters Patent is:

1. In a cylinder gauge, a base presenting portions adapted for stable contact interiorly of a cylinder along two spaced parallel lines, a dial indicator slidably mounted on said base for movement transversely relative thereto and having a pointer and a pair of spaced alined bearings, a member reciprocably mounted in one of said bearings and provided at one end with means detachably to receive a contact element, a contact element detachably connected with said reciprocable member, a contact element mounted in the other of said bearings, said contact elements adapted to contact with the interior of the cylinder in a plane perpendicular to the plane containing the lines of contact of said base, a spring confined between said reciprocable member and said last-named contact element, and motion transmitting connections between said reciprocable member and the pointer of said dial.

2. In a cylinder gauge, a base presenting portions adapted for stable contact interiorly of a cylinder along two spaced parallel lines, a dial indicator slidably mounted on said base for movement transversely relative thereto and having a pointer and a pair of spaced alined bearings, a rack bar reciprocably mounted in one of said bearings and provided at one end with means detachably to receive a contact element, a contact element detachably connected with said rack bar, a contact element mounted in the other of said bearings, said contact elements adapted to contact with the interior of the cylinder in a plane perpendicular to the plane containing the lines of contact of said base, a coil spring confined between said rack bar and said last-named contact element, and motion transmitting connections between said rack bar and the pointer of said dial.

3. A dial indicator comprising a pointer, a dial, and a base having a pair of spaced aligned bearings, a rack bar mounted in one of said bearings and having a socket at its outer end, a contact element mounted in the other of said bearings, a coil spring confined between said rack bar and contact element, a second contact element detachably engageable in the socket of said rack bar, a gear segment meshing with said rack bar, a second rack bar disposed at right angles to said first-named rack bar and meshing with said gear segment, and motion transmitting connections between said second-named rack bar and said pointer.

4. A cylinder gauge, comprising a base, a dial indicator slidably mounted on said base for movement transversely relative thereto and having a pointer, a pair of spaced alined contacts associated with said dial indicator and adapted for engagement with the cylinder wall at diametrically opposite points, a spring mechanism between said base and dial indicator for urging said contacts into engagement with the cylinder wall whereby the gauge is self-sustaining within the bore of the cylinder, a second spring mechanism associated with said contacts and superior to the first-named spring mechanism for permitting indexing movement of one of said contacts relative to the dial indicator, and motion transmitting connections between one of said contacts and the pointer of the dial indicator.

5. A cylinder gauge, comprising a base adapted for stable contact within a cylinder along two spaced parallel lines of contact, a dial indicator slidably mounted on said base for movement transversely relative thereto and having a pointer, a pair of spaced alined contacts associated with said dial indicator and adapted for engagement with the cylinder wall at diametrically opposite points located in a plane perpendicular to that containing the lines of base contact with the cylinder wall, a spring mechanism between said base and dial indicator for urging said contacts into engagement with the cylinder wall whereby the gauge is self-sustaining within the bore of the cylinder, a second spring mechanism associated with said contacts and superior to the first-named spring mechanism for permitting indexing movement of one of said contacts relative to the dial indicator, and motion transmitting connections between one of said contacts and the pointer of the dial indicator.

6. A cylinder gauge comprising a base adapted to be positioned longitudinally within a cylinder, a dial indicator yieldably mounted upon said base and having a pointer, a pair of spaced alined contact elements mounted on said dial indicator for engagement with the cylinder wall at diametrically opposite points, a spring mechanism between said base and dial indicator for urging said contacts into engagement with the cylinder wall whereby the gauge is self-sustaining within the bore of the cylinder, a transversely disposed rack bar actuated by one of said contact elements, a gear segment meshing with said rack bar, a second rack bar disposed at right angles to said first-named rack bar and meshing with said gear segment, and motion transmitting connections between said second-named rack bar and the pointer of said dial indicator.

7. A cylinder gauge comprising a base adapted to bear upon the inner face of a cylinder wall along two spaced lines of longitudinal contact, a dial indicator yieldingly mounted upon said base and having a pointer, a contact element mounted on said dial indicator for engagement with the cylinder wall transversely of the cylinder, a contact element aligned with said first-named contact element for engagement with the cylinder wall at a point diametrically opposite the first-named contact element, a spring mechanism between said base and dial indicator for urging said contacts into engagement with the cylinder wall whereby the gauge is self-sustaining within the bore of the cylinder, a second spring mechanism associated with said contacts and superior to said first named spring mechanism for permitting indexing movements of one of said contacts relative to the dial indicator, and motion transmitting connections between said last-named contact element and the pointer of said dial indicator.

8. A cylinder gauge comprising a base adapted to bear upon the inner face of a cylinder wall along two spaced lines of longitudinal contact, a dial indicator yieldably mounted upon said base and having a pointer, a contact element mounted on said dial indicator for engagement with the cylinder wall transversely of the cylinder and intermediate of the lines of contact of said base with said wall, a contact element aligned with said first-named contact element for engagement with the cylinder wall at a point diametrically opposite the first-named contact element, a spring mechanism between said base and dial indicator for urging said contacts into engagement with the cylinder wall whereby the gauge is self-sustaining within the bore of the cylinder, a second spring mechanism associated with said contacts and superior to said first-named spring mechanism for permitting indexing movements of one of said contacts relative to the dial indicator, and motion transmitting connections between said last named contact element and the pointer of said dial indicator.

9. A cylinder gauge comprising a base adapted to bear upon the inner face of a cylinder wall along two spaced lines of longitudinal contact, a dial indicator yieldably mounted upon said base and having a pointer, a contact element mounted on said dial indicator for engagement with the cylinder wall transversely of the cylinder, a contact element aligned with said first-named contact element for engagement with the cylinder wall at a point diametrically opposite the first-named contact element, a spring mechanism between said base and dial indicator for urging said contacts into engagement with the cylinder wall whereby the gauge is self-sustaining within the bore of the cylinder, a second spring mechanism associated with said contacts and superior to said first-named spring mechanism for permitting indexing movements of one of said contacts relative to the dial indicator, and motion transmitting connections between said last-named contact element and the pointer of said dial indicator comprising a transversely disposed rack bar, a gear segment meshing therewith, a second rack bar disposed at right angles to said first-named rack bar and meshing with said gear segment, and operative connections from said second-named rack bar to the pointer of the dial indicator.

10. A dial indicator, comprising a pointer, a dial, and a base having a pair of spaced alined bearings, a rack bar mounted in one of said bearings and provided at its outer end with means for detachably receiving a contact element, a contact element detachably connected with said rack bar, a contact element mounted in the other of said bearings, a spring confined between said last-named contact element and said rack bar, a gear segment meshing with said rack bar, a second rack bar disposed at right angles to said first-named rack bar and meshing with said gear segment, and motion transmitting connections between said second-named rack bar and said pointer.

11. A cylinder gauge comprising an elongated frame adapted to bear upon the inner face of a cylinder wall along two spaced lines of longitudinal contact, a dial indicator yieldably mounted upon said frame for movement transversely relative thereto, a pair of spaced aligned contact elements mounted upon said dial indicator for engagement with the cylinder wall at diametrically opposite points, one of said contact elements engaging said wall intermediate of the points of bearing of said frame thereon, and motion transmitting connections between the other of said contact elements and the pointer of the dial indicator comprising a rack bar slidably mounted between said contact elements, a spring opposing the movement of said rack bar in one direction, a gear segment meshing with said rack bar, a second rack bar disposed at right angles to said first-named rack bar and meshing with said gear segment, and operative connections between said second-named rack bar and the pointer of said dial indicator.

12. A dial indicator comprising a pointer, a dial, and a base having a pair of spaced aligned bearings, a pair of contact elements mounted in said bearings, and motion transmitting connections between one of said contact elements and said pointer of the dial indicator comprising a rack bar slidably mounted between said contact elements, a spring opposing the movement of said rack bar in one direction, a gear segment meshing with said rack bar, a second rack bar disposed at right angles to said first-named rack bar and meshing with said gear segment, and operative connections between said second-named rack bar and the pointer of said dial indicator.

13. A cylinder gauge comprising an elongated handle, a frame at one end of said handle having a pair of spaced horizontally extending posts, a dial indicator casing comprising a base having a pair of bores to receive said posts, springs associated with said posts and normally maintaining the casing projected away from said frame, a pair of aligned bearings on said base between said posts, a pair of contact stems mounted in said bearings, a rack bar actuated by one of said stems, a spring opposing the movement of said rack bar in one direction, and motion transmitting connections between said rack bar and the pointer of the dial indicator for converting the reciprocation of said rack bar into a rotary motion applied to said pointer.

14. A cylinder gauge comprising an elongated handle, a frame at one end of said handle and having a pair of spaced side members rounded on their rear faces on a radius substantially conforming to the curvature of a cylinder wall and having a pair of spaced horizontally extending posts projecting from said side members, a dial indicator casing comprising a base having a pair of bores to receive said posts, springs associated with said posts and normally maintaining the casing projected away from said frame, a pair of aligned bearings on said base between said posts, a pair of contact stems mounted in said bearings, a rack bar actuated by one of said stems, a spring opposing the movement of said rack bar in one direction, the tension of said last-named spring being greater than the combined tension of the springs associated with said guide posts, and motion converting connections between said rack bar and the pointer of the dial indicator for transmitting the reciprocation of said rack bar as rotary motion applied to said pointer.

15. A cylinder gauge comprising an elongated handle, a frame at one end of said handle having a pair of spaced horizontally extending posts, a dial indicator casing comprising a base having a pair of bores to receive said posts, springs associated with said post and normally maintaining the casing projected away from said frame, a pair of aligned bearings on said base between said posts, a pair of contact stems mounted in said bearings, a rack bar actuated by one of said stems, a spring opposing the movement of said rack bar in one direction, a gear segment journaled within said dial indicator casing and meshing with said rack bar, a second-rack bar disposed at right angles to said first-named rack bar and meshing with said gear segment, and motion transmitting connections between said second-named rack bar and the pointer of the dial indicator.

16. A cylinder gauge comprising a pair of spaced contact elements, a spring-controlled diameter indicating gauge, and spring elements operatively disposed between the spaced elements and the gauge and inferior to the strength of the spring of said gauge whereby the spaced elements are yieldingly contacted with the cylinder walls in self-sustaining relation thereto.

17. A cylinder gauge, comprising a frame adapted to be positioned longitudinally within a cylinder, a dial indicator yieldably mounted on said frame, cylinder contacts associated with said dial indicator, a spring normally urging said dial indicator away from said frame towards said cylinder wall and compressed when the dial indicator is inserted within a cylinder bore of greater diameter than the maximum distance between its contact points to permit said dial indicator to accommodate itself within the cylinder bore and to sustain the dial indicator at the desired level within the cylinder bore, and a spring associated with said cylinder contacts and of greater strength than said first-named spring to permit indexing movements of one of said contacts relative to the dial indicator.

In testimony whereof I affix my signature.

ROBERT J. O. SIMPSON.